UNITED STATES PATENT OFFICE.

VALERIUS KOBELT, OF BERLIN, GERMANY.

PROCESS OF OBTAINING BASE-EXCHANGING SUBSTANCES.

1,147,515.  Specification of Letters Patent.  Patented July 20, 1915.

No Drawing.   Application filed January 19, 1914.   Serial No. 813,097.

*To all whom it may concern:*

Be it known that I, VALERIUS KOBELT, a subject of the Emperor of Germany, residing at Haberlandstrasse 3, Berlin, W., Germany, have invented certain new and useful Improvements in Processes of Obtaining Base-Exchanging Substances; and I do hereby declare the following to be a full, clear, and exact description of the invention, such as will enable others skilled in the art to which it appertains to make and use the same.

The base-exchanging substances occurring in nature are not directly adapted for the purification of water. They are generally so greatly mixed with ineffective or partly disturbing ingredients, that the efficiency is very small. This low efficiency is partly due to the impurities, partly to the insufficient porosity, and to the small superficial area resulting therefrom. A further disadvantage of most natural products of this kind is that they tend toward petrification, will cake with time, and thereby lose in effectiveness.

According to the present invention base-exchanging natural products, particularly those of the character of rock glass so-called "Gesteins glas", for instance volcanic glass from trachytes and tuffs when treated chemically become specially adapted for the purification of water. This treatment is performed by the aid of acids, the substances being mixed, or heated for a certain period with hydrochloric acid of 0.1 per cent. By the treatment with acid, the impurities, which are soluble in hydrochloric acid, such as hauyne, magnetic iron ore and the like, are dissolved and other basic materials are also separated from the volcanic glass (Gesteins glas). In consequence thereof, the effective material is, on the one hand, concentrated, and on the other hand it becomes highly porous by reason of certain component parts being removed.

The acid will withdraw from amorphous rock glass the soluble bases such as soda, lime, potash, and magnesia, and the "Gesteins glas" thereby becomes a porous framework, which has the property of receiving a deposit of alkali and earth alkali in its pores.

For the purification of water, the material which has been subjected to the acid treatment must, however, be provided with bases for instance, soda is introduced by treatment with a solution of common salt, the remaining bases of other characteristics are displaced by the base of the common salt according to the law of action of the masses, and sodium ions are introduced therefor. By such means a concentrated, purified and highly effective material is obtained for the purification or the softening of water.

It is advantageous to apply the process to such base exchanging substances, which have been subjected to an improving preliminary treatment, or which have by a special treatment received the property of exchanging bases.

Chiefly a previous mechanical treatment will come into question. The effective material is separated from volcanoclastic rocks, such as trachyte-tuffs by a settling process. The volcanoclastic rocks, including the volcanic glass (Gesteins glas) are previously reduced to a grain of 1 to 1½ millimeters. The components are separated according to their specific gravity, by the granular material being treated in moving settling tanks with flowing water. The lighter base exchanging components rise to the top, while the specifically heavier impurities sink to the bottom and are thence removed.

When the material which has been treated, according to the present invention, with acid, be it previously treated or not, is to be used for removing manganese and iron from water, manganese compounds are introduced. This is done by alternately introducing, before its use, lower and higher manganese salts. For instance, the material is first treated with a manganous salt and then with permanganate. It is also possible to provide the previously acid treated native product with a lime base by treatment with a solution of chlorid of calcium.

I claim—

1. The process of obtaining base-exchanging substances, for the purification of water, from natural products having the property of exchanging bases, which comprises treating said products with acids, and embodying in said products the bases intended for subsequent exchange.

2. The process of obtaining base-exchanging substances, for the purification of water, from natural products having the property of exchanging bases, which comprises submitting said products to a mechanical comminution and flotation, treating the dressed products with acids, and embodying in said products the bases intended for subsequent exchange.

3. The process of obtaining base exchanging substance for removing iron and manganese from water from natural base-exchanging products, which consists in treating said products with acids, and subjecting the products alternately to the action of low and high manganese salts.

4. The process of obtaining base-exchanging substances, for removing iron and manganese from water, from natural products which comprises treating said products to give them the property of exchanging bases, and subjecting the acid treated products alternately to the action of manganese salts in different stages of oxidation.

5. A base-exchanging substance, comprising an acid treated porous rock glass (Gesteins glas), containing bases in its pores, said bases capable of exchanging places with impurities in water.

6. A base exchanging substance comprising acid treated porous volcanic glass containing in its pores a base combined with a manganese compound.

In testimony that I claim the foregoing as my invention, I have signed my name in presence of two subscribing witnesses.

VALERIUS KOBELT.

Witnesses:
  HENRY HASPER,
  WOLDEMAR HAUPT.

Copies of this patent may be obtained for five cents each, by addressing the "Commissioner of Patents, Washington, D. C."